US010005398B2

(12) United States Patent
Kim

(10) Patent No.: US 10,005,398 B2
(45) Date of Patent: Jun. 26, 2018

(54) CARGO MANAGEMENT SYSTEM FOR A VEHICLE

(71) Applicant: GM GLOBAL TECHNOLOGY OPERATIONS LLC, Detroit, MI (US)

(72) Inventor: Taryn Dyle Kim, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

(21) Appl. No.: 15/208,856

(22) Filed: Jul. 13, 2016

(65) Prior Publication Data

US 2018/0015882 A1    Jan. 18, 2018

(51) Int. Cl.
*B60R 7/02*    (2006.01)
*B60R 5/04*    (2006.01)

(52) U.S. Cl.
CPC . *B60R 7/02* (2013.01); *B60R 5/04* (2013.01)

(58) Field of Classification Search
CPC .................................. B60R 7/02; B60R 5/04
See application file for complete search history.

(56) References Cited

U.S. PATENT DOCUMENTS 5,167,479 A * 12/1992 Bott ..................... B01D 53/485
224/42.33

* cited by examiner

*Primary Examiner* — D Glenn Dayoan
*Assistant Examiner* — Melissa A Black
(74) *Attorney, Agent, or Firm* — Quinn IP Law

(57) ABSTRACT

A cargo management system for use in a vehicle cargo area includes at least one guide rail disposed on the load floor of the cargo area and include an elongate slot at least partially formed therein. At least one track incorporating a plurality of locking portions is disposed on the load floor proximate the at least one guide rail. A support member includes a housing and one or more extensions at least partially received within the elongate slot of the at least one guide rail. The support member is disposed adjacent to and movably positioned relative to the load floor. A locking mechanism is adjustably connected to the support member housing and includes a locking member having a projection that releasably engages one or more locking portions of the at least one track.

18 Claims, 3 Drawing Sheets

CARGO MANAGEMENT SYSTEM FOR A VEHICLE

TECHNICAL FIELD

The present disclosure relates to a cargo area for a vehicle, and more particularly, to a cargo management system for a vehicle.

BACKGROUND

Vehicles may include a load floor that is configured to support cargo in a cargo area. For example, minivans and sport-utility vehicles typically include a cargo area in the rear of the vehicle. Access to the cargo area is provided by a rear body opening that is selectively closed by a rear closure panel, such as a tailgate or a lift gate. Similarly, pickup trucks include a cargo area, i.e., a cargo box, with access to the cargo box being provided by an opening at the rear of the truck and that is selectively closed by a tailgate. The load floor forms the lower surface of the cargo area or cargo box.

Cargo storage areas are utilized to store and transport a wide array of items including luggage, work bags, grocery bags and other items. The open cargo storage area may not provide a suitable means of securing the cargo, thereby allowing the items to move around the storage area during transport.

SUMMARY

A cargo management system for use in a vehicle cargo area includes at least one guide rail including an elongate slot at least partially formed therein that is disposed on the load floor of the vehicle cargo area. At least one track incorporating a plurality of locking portions is disposed on the load floor. A support member includes a housing and one or more extensions at least partially received within the elongate slot of the at least one guide rail and is disposed adjacent and movably positioned relative to the load floor.

A locking mechanism is adjustably connected to the support member housing. The locking mechanism includes a locking member having a projection that releasably engages the at least one of the plurality of locking portions of the at least one track. The support member is movable relative to the load floor through the at least one guide rail and at least one track between at least an unlocked position and at least one locked position such that the locking member projection engages at least one of the plurality of locking portions of the at least one track to secure the support member adjacent the load floor.

The cargo area is defined between a roof, opposing lateral sidewalls and the load floor of the vehicle. The at least one track further comprises a track having a surface receiving the plurality of spaced apart raised locking portions, the track extending generally laterally along the load floor between the opposing lateral sidewalls of the cargo area. The at least one guide rail disposed on the load floor further comprises first and second guide rails extending generally laterally on the load floor and positioned on opposing sides of the track.

The locking member of the locking mechanism includes a first end pivotally connected to the support member housing to position the locking member between the unlocked position and the at least one locked position a second end supporting the locking member projection for releasably engaging at least one of the plurality of locking portions. The one or more extensions include a first end at least partially received within the slot in the at least one guide rail and a second end pivotally secured to the support member housing. The support member housing may be adjustably positioned about the second end of the one or more extensions between an extended position wherein the support member housing is generally perpendicular to the load floor and a retracted position wherein the support member housing is positioned generally parallel to the load floor.

In one embodiment of the disclosure, the load floor further comprises an opening extending at least partially through the load floor and a cover panel cooperating with and removably secured adjacent the opening in the load floor to at least partially cover the opening in the load floor. The at least one guide rail and at least one track are disposed on the cover panel to receive and adjustably position the support member. The at least one guide rail disposed on the cover panel further comprises first and second guide rails extending generally laterally on the cover panel positioned proximate to the opposing sides of the at least one track in the cover panel.

In another embodiment of the disclosure, a vehicle includes a load floor and opposing sidewalls cooperating with the load floor to partially define a cargo area. A cargo management system includes at least one guide rail disposed on the load floor. The at least one guide rail include an elongate slot at least partially formed therein. At least one track incorporating a plurality of locking portions is disposed on the load floor. A support member includes a housing and one or more extensions at least partially received within the elongate slot of the at least one guide rail. The support member may be disposed adjacent and movably positioned relative to the load floor.

A locking mechanism is adjustably connected to the support member housing. The locking mechanism includes a locking member having a projection that releasably engages the one or more plurality of locking portions of the at least one track. The support member is movable relative to the load floor through the at least one guide rail and at least one track between at least an unlocked position and at least one locked position such that the locking member projection engages at least one of the plurality of locking portions of the at least one track to secure the support member adjacent the load floor.

The at least one track further comprises a track having a surface receiving the plurality of spaced apart raised locking portions, the track extending generally laterally along the load floor between the opposing lateral sidewalls of the cargo area. The at least one guide rail disposed on the load floor further comprises first and second guide rails extending generally laterally on the load floor and positioned proximate to the opposing sides of the track.

The locking member of the locking mechanism includes a first end pivotally connected to the support member housing to position the locking member between the unlocked position and the at least one locked position a second end supporting the locking member projection for releasably engaging at least one of the plurality of locking portions. The one or more extensions include a first end at least partially received within the slot in the at least one guide rail and a second end pivotally secured to the support member housing. The support member housing may be adjustably positioned about the second end of the one or more extensions between an extended position wherein the support member housing is generally perpendicular to the load floor and a retracted position wherein the support member housing is positioned generally parallel to the load floor.

In yet another embodiment of the disclosure, the load floor further comprises an opening extending at least partially through the load floor and a cover panel cooperating with and removably secured adjacent the opening in the load floor to at least partially cover the opening in the load floor. The at least one guide rail and at least one track are disposed on the cover panel to receive and adjustably position the support member. The at least one guide rail disposed on the cover panel further comprises first and second guide rails extending generally laterally on the cover panel positioned on opposing sides of the at least one track in the cover panel.

In another embodiment of the disclosure, a cargo management system for use in a vehicle cargo area at least partially defined by opposing sidewalls cooperating with a load floor comprises first and second guide rails disposed on and extending generally laterally on the vehicle load floor including an elongate slot at least partially formed therein. A track is disposed on the load floor and includes a plurality of spaced apart raised locking portions extending from a surface of the track. The track extends generally laterally along the load floor between the opposing lateral sidewalls of the cargo area and proximate the first and second guide rails.

A support member includes a housing and one or more extensions having a first end adjustably positioned on the housing and a second end at least partially received within the elongate slot of the at least one guide rail. The support member is disposed adjacent and movably positioned relative to the load floor. A locking mechanism is adjustably connected to the support member housing. The locking mechanism includes a locking member having a first end pivotally connected to the support member housing to position the locking member between an unlocked position and at least one locked position a second end supporting a locking member projection for releasably engaging at least one of the plurality of locking portions of the track.

The support member is movable relative to the load floor through the at least one guide rail and at least one track between at least the unlocked position and the at least one locked position such that the locking member projection engages at least one of the plurality of locking portions of the at least one track to secure the support member adjacent the load floor. The one or more extensions include a first end received within the slot in the at least one guide rail and a second end pivotally secured to the support member housing. The support member housing may be adjustably positioned about the second end of the one or more extensions between an extended position wherein the support member housing is generally perpendicular to the load floor and a retracted position wherein the support member housing is positioned generally parallel to the load floor.

The above noted and other features and advantages of the present disclosure are readily apparent from the following detailed description when taken in connection with the accompanying drawings.

DETAILED DESCRIPTION

Figure 1:
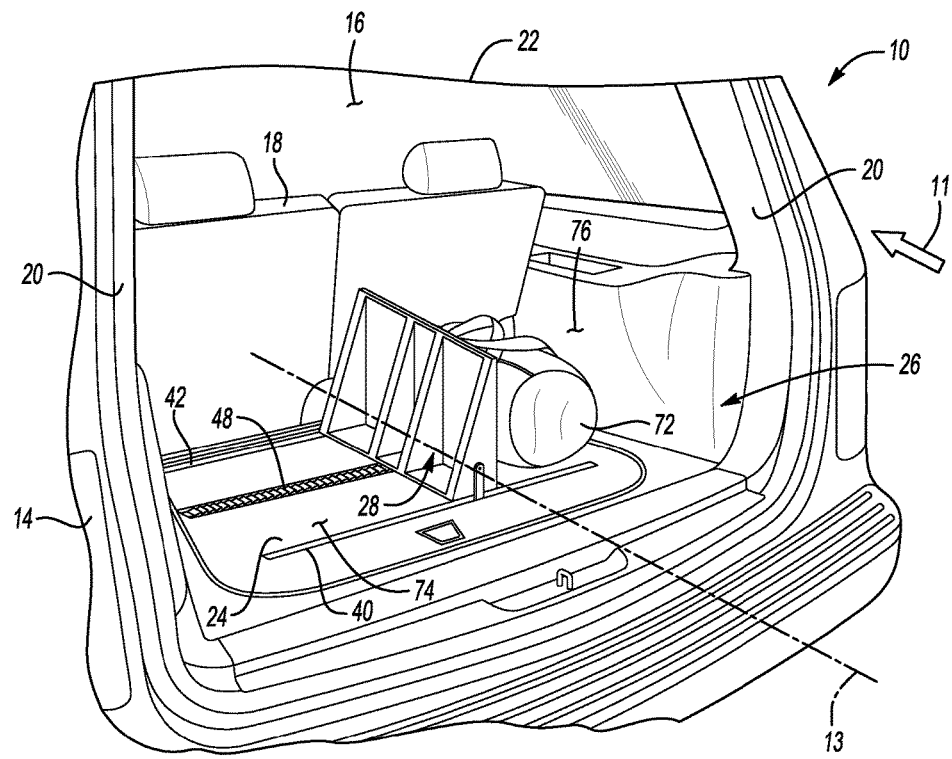
FIG. 1 is a perspective view of a rear end of a vehicle having a cargo management system for use in an interior cargo area of the vehicle.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring to the drawings, wherein like reference numbers correspond to like or similar components throughout the several Figures, FIG. 1 shows a schematic view of a motor vehicle 10. Vehicle 10 is shown for illustrative purposes and demonstrates only one possible environment into which a cargo management system 80 may be defined. It is understood that the vehicle 10 may be any mobile platform, such as an airplane, all-terrain vehicle (ATV), boat, personal movement device, robot and the like to accomplish the purposes of this disclosure.

A body 14 of the vehicle 10 includes a rear door opening 16. A vehicle seat 18 is disposed within an interior of the vehicle 10 and is accessible through the rear door opening 16. The seats 18 may be second or third row of seats in a sport utility vehicle or the like. Alternatively, the seats 18 may be the front seats in a vehicle 10 having only one row of seats, such as a pickup. The forward facing direction in the vehicle 10 is indicated by arrow 11. Opposing lateral sidewalls 20 of the vehicle body 14 include an interior portion extending between a roof 22 of the vehicle body 14 and a load floor 24. The sidewalls 20 and load floor 24 cooperate to partially define an interior cargo area 26 therebetween. The opposing sidewalls 20 are shown only in fragmentary partial view. The sidewalls 20 may each be an assembly of multiple components, such as an outer panel, an inner panel, and trim components, and other components that generally are included in a vehicle side wall. The cargo area 26 extends behind the seats 18, between the opposing sidewalls 20, and above the load floor 24. Rear closure panels (not shown) further defines the cargo area 26.

It is understood that use of direction terms relative to the vehicle orientation may be used throughout the description regarding location of the components within the vehicle 10. Thus, the forward direction as represented by arrow 11 would be toward an engine compartment (not shown) for the vehicle 10 and opposite the rear end of the vehicle 10 as illustrated in FIG. 1. The load floor 24 may include a floor covering or upholstery, such as carpet or the like, to match with the interior of the vehicle 10. Load floor 24 may be generally horizontal to and parallel with the rear door opening 16.

Figure 2:
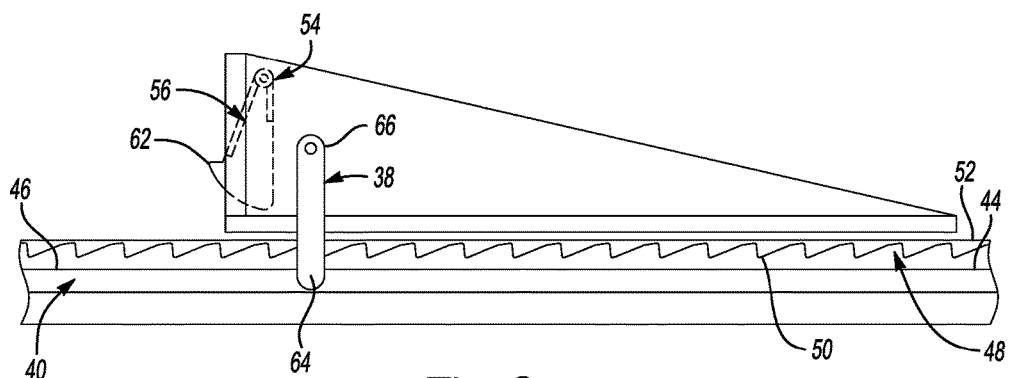
FIG. 2 is a side plan view of a support wall of the storage management system disposed in a retracted position generally parallel with and adjacent to a load floor of the cargo area in accordance with the disclosure.

Referring additionally now to FIG. 2, cargo management system 80 includes a support member 28 disposed adjacent to and movably positioned relative to the load floor 24 of the vehicle 10. Support member 28 includes a housing 30 having an upper surface 32, a lower surface 34 and opposing sidewalls 36 extending between the upper surface 32 and lower surface 34. One or more extensions 38 are adjustably connected to the support member housing 30 and are operable to be received within and travel through corresponding at least one guide rail 40 provided adjacent to or disposed in the load floor 24.

As illustrated in FIG. 1, the at least one guide rail 40 extends generally laterally through the interior cargo area 26 between the opposing sidewalls 20 of the vehicle 10 and generally perpendicular to a longitudinal axis 13 of the vehicle 10. In one embodiment of the disclosure, the at least one guide rail 40 includes a first guide rail 40 disposed proximate the rear door opening 16 and a second guide rail 42 disposed proximate vehicle seats 18. Guide rails 40, 42 may be integrally formed in the load floor 24 or may be welded, bolted, fastened, or otherwise secured to the load floor 24 such that rails 40, 42 are integrated into the vehicle 10.

Guide rails 40, 42 are configured for positioning the one or more extensions 38 connected to the support member 28 within the cargo area 26 of the vehicle 10. It is also appreciated that the guide rails 40, 42 may extend generally parallel to the longitudinal axis 13 of the vehicle within the cargo area 26 to perform the functions of the disclosure. Each of the guide rails 40, 42 includes a slot 44 that extends longitudinally in an upward-facing surface 46 along the rails 40, 42.

Slots 44 in guide rails 40, 42 may extend the full length of the guide rail 40, 42 or may be provided through a portion of the guide rails 40, 42. Slots may be generally U-shaped in profile, though other shapes of the slots 44 are within the scope of the disclosure. Furthermore, the slots 44 in guide rails 40, 42 need not be the same shape. Although only the slot 44 in guide rail 40 is shown in detail, guide rail 42 may be a mirror image of the guide rail 40 and also includes a slot 44 that extends longitudinally along the guide rail 42 in an upward-facing surface 46. The one or more extensions 38 are at least partially received within the elongate slot 44 of the at least one guide rail 40, 42.

Referring back to FIG. 1, at least one track 48 is disposed on the load floor 24. The at least one track 48 may include a plurality of locking portions 50 disposed on an upward facing surface 52 of the track 48. In one embodiment of the disclosure, a single track 48 extends generally laterally along the load floor 24 between and proximate to the opposing lateral sidewalls 20 of the cargo area 26 with guide rails 40, 42 disposed on each side of track 48 on the load floor 24. As with the at least one guide rail 40, 42, the at least one track 48 may be integrally formed in the load floor 24 or may be welded, bolted, fastened, or otherwise secured to the load floor 24 such that track 48 is integrated into the vehicle 10.

Figure 3:
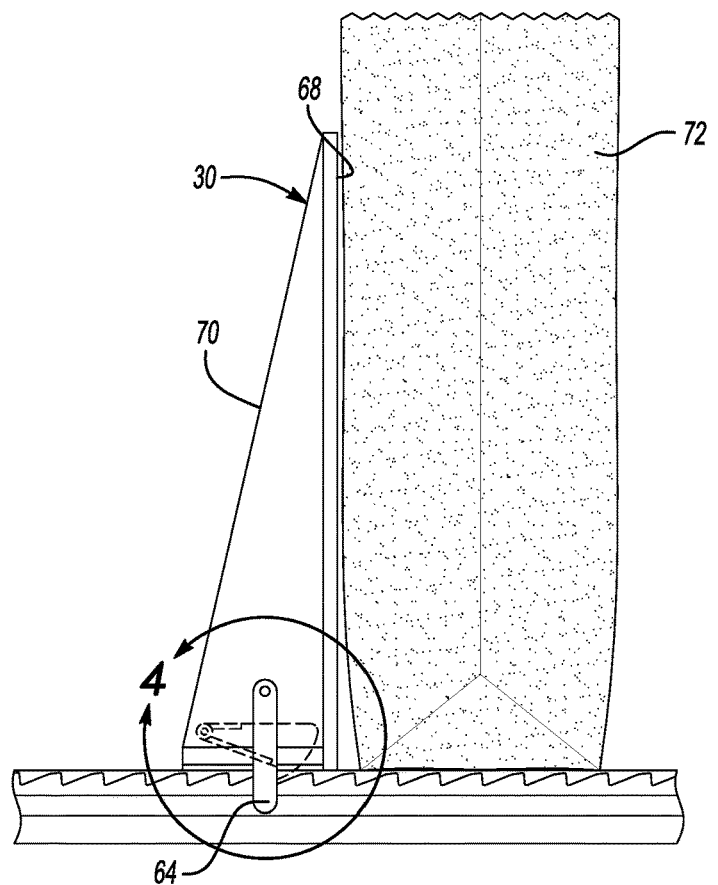
FIG. 3 is a side plan view of a support wall of the storage management system disposed in an extended position generally perpendicular to the load floor and the support surface in accordance with the disclosure.
Figure 4:
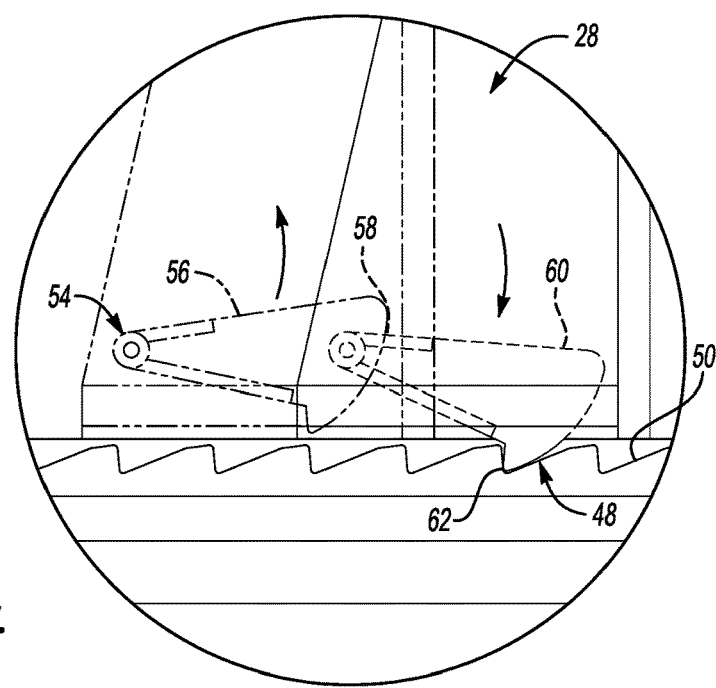
FIG. 4 is a cross-sectional side plan view of a locking mechanism engaging the at least one track to position the support member relative to the load floor of the cargo management system along line 4-4 in FIG. 3.

Referring now to FIGS. 2-4, cargo management system 80 of vehicle 10 includes a locking mechanism 54 adjustably connected to the support member housing 30. The locking mechanism 54 includes a locking member 56 having a first end 58 pivotally connected to the support member housing 30 and a second end 60. Locking member 56 is adjustably positioned relative to the support member housing 30 between an unlocked position as illustrated in FIG. 2 and at least one locked position as shown in FIGS. 3 and 4.

As shown in FIG. 2, a projection 62 is supported by and extends from the second end 60 of the locking member 56 above the plurality of locking portions 50 on the at least one track 48. FIGS. 3 and 4 illustrate the locking member 56 of locking mechanism 54 in the at least one locked position, where the projection 62 on the second end 60 of the locking member 56 releasably engages at least one of the plurality of locking portions 50. It is contemplated that the first end 58 of the locking member 56 may be spring biased such that the projection 62 on the second end 60 is forced into contact with at least one of the plurality of locking portions 50 to ensure that the support member 28 remains in position relative to the load floor 24.

The one or more extensions 38 include a first end 64 at least partially received within and traveling through the slot 44 in the at least one guide rail 40 on the load floor 24 and a second end 66 pivotally secured to the support member housing 30. The support member housing 30 may be adjustably positioned about the second end 66 of the one or more extensions 38 between an extended position as shown in FIG. 3 wherein the support member housing 30 is generally perpendicular to the load floor 24 and a retracted position as shown in FIG. 2 wherein the support member housing 30 is positioned generally parallel to the load floor 24.

In one embodiment of the disclosure, the first end 64 may include a portion configured to be received within and travel through the slot 44 in the at least one guide rail 40. Alternatively, the first end 64 of the one or more extensions 38 may be releasably secured in the at least one guide rail 40 to allow the support member housing 30 to pivot about the second end 66 of the one or more extensions 38 to move the support member housing 30 between the retracted position as shown in FIG. 2 and the extended position in FIG. 3. The first end 64 of the one or more extensions 38 may by shaped to be complementary with the respective shape of the slot 44 in the at least one guide rail 40.

As is best shown in FIGS. 1 and 3, support member housing 30 includes a generally vertical support surface 68 formed between the upper surface 32, lower surface 34 and opposing sidewalls 36 of the housing 30 and an opposing structural support surface 70. Vertical surface 68 of the support member 28 cooperates with the opposing sidewalls 20 in the cargo area 26 of the vehicle 10 to securely position items 72 in the cargo area 26 and divide the cargo area 26 into at least a first storage area 74 and a second storage area 76 as shown in FIG. 1.

Figure 5:
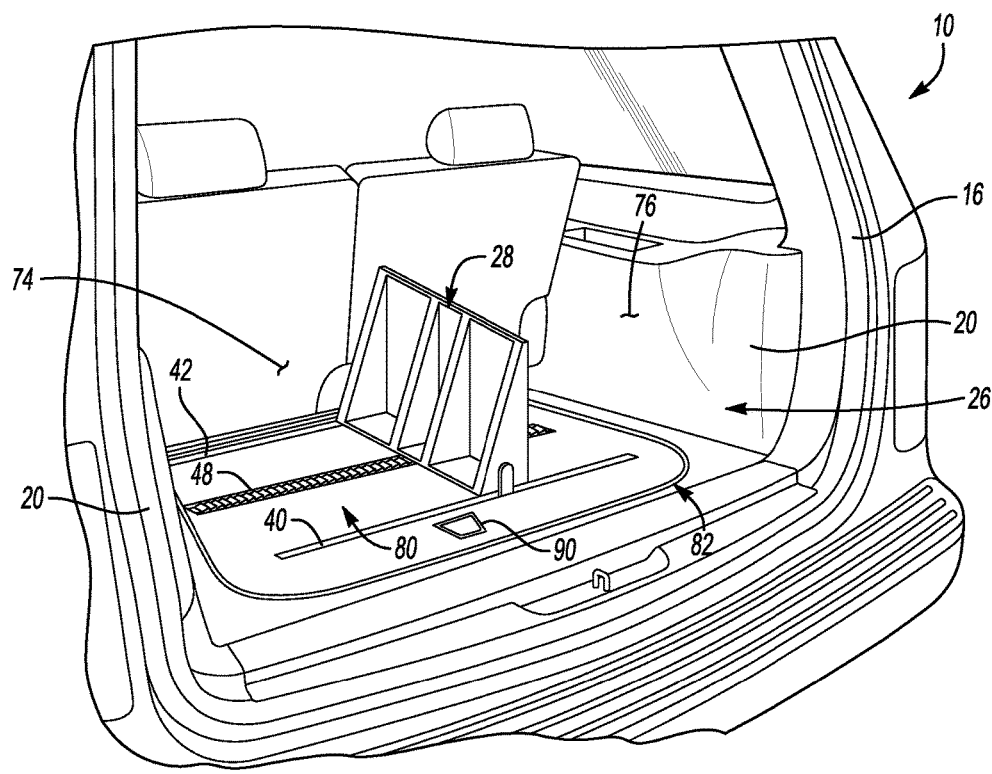
FIG. 5 is a perspective view of a rear end of a vehicle showing another embodiment of the cargo management system for use in an interior cargo area of the vehicle.
Figure 6:
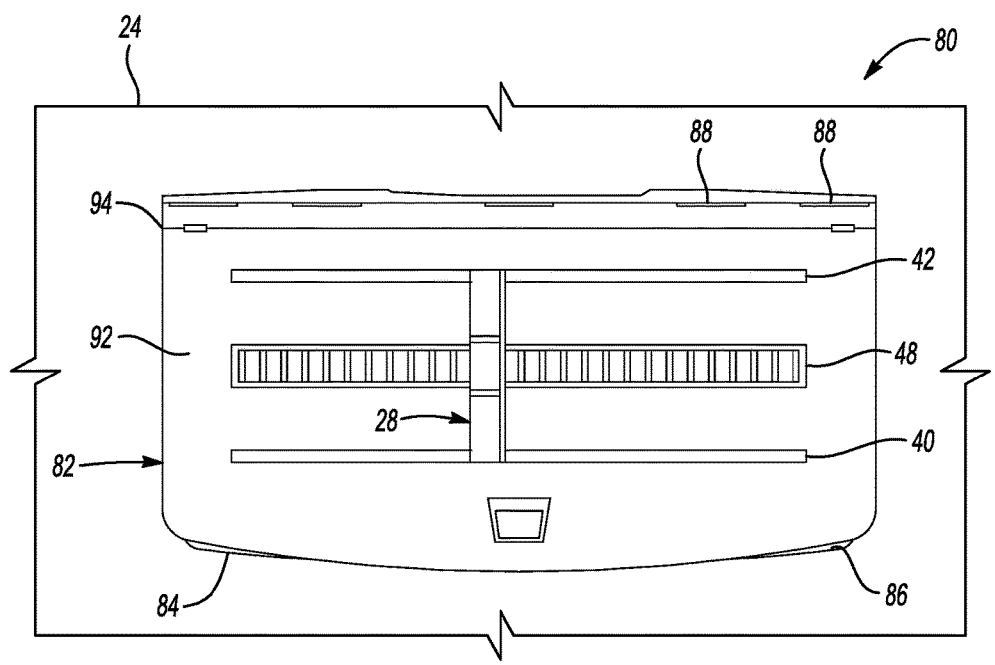
FIG. 6 is a top plan view of the cargo management system in accordance with another embodiment of the disclosure.

Referring now to FIGS. 5 and 6, another embodiment of the cargo management system 80 of the disclosure is described and illustrated. Similar reference numbers for items identified in FIGS. 1-4 are used in FIGS. 5 and 6. Cargo management system 80 may be disposed on or defined in a cover panel 82. The cover panel 82 is disposed adjacent to and at least partially covers an opening 84 in the load floor 24 adjacent a cargo space 86. The load floor 24 and the cargo space 86 may be integrally formed as a unitary structure or may be formed as distinct parts such that the cargo space 86 is secured to the load floor 24 adjacent opening 84 to house a spare tire, luggage, or the like in the cargo space 84.

Cover panel 82 is adjustably connected to at least one of the load floor 24 by one or more adjustable position devices 88, such as hinges, living hinges or other similar devices. The cover panel 82 may be adjustably positioned between a first or closed position wherein the cover panel 82 is substantially parallel to and coplanar with the load floor 24 to at least partially cover the opening 84 and at least one second or open position wherein the cover panel 82 extends away from opening 82 in the load floor 24 to expose the cargo space 86.

In the first or closed position, the cover panel 82 is configured to at least partially conceal contents within the cargo space 86. The load floor 24 and cover panel 82 cooperate to provide a contiguous surface to receive and support objects thereon. In a second or at least one open position (not shown), cover panel 82 is moved away from the opening 84 adjacent the cargo space 86 to allow access to the cargo space 86. Alternatively, the cover panel 82 may be removably disposed in the opening 84 of the load floor 24.

The cover panel 82 shown in FIGS. 5 and 6 may be releasably securable adjacent the opening 84 in the load floor 24 by a handle assembly 90 or pull feature. However, the handle assembly 90 may not be required and other features may be used to access the cargo space 86. Cover panel 82 may be constructed from a composite or plastic material and include an upper surface 92 and an opposing lower surface 94. Upper surface 92 of the cover panel 82 defines a load bearing surface and may be covered or upholstered with material to match with the interior cargo area of the vehicle 10.

The at least one guide rail 40 and at least one track 48 are disposed on the removably secured cover panel 82 to receive and adjustably position a support member 28 thereon. As is shown in FIG. 6, the at least one guide rail 40 disposed on the upper surface 92 of cover panel 82 include first and second guide rails 40, 42 extending generally laterally on the upper surface 92 of cover panel 82 and are positioned on opposing sides of the at least one track 48 on the cover panel 82. As with the at least one guide rail 40, 42, the at least one track 48 may be integrally formed in the upper surface 92 of the cover panel 82 or may be welded, bolted, fastened, or otherwise secured to the upper surface 92 of the cover panel 82 such that track 48 is integrated into the cover panel 82. This structural arrangement allows the support member 28 to be selectively positioned on the cover panel 82 and movable between a retracted position generally parallel to the cover panel 82 and an extended position generally perpendicular to the cover panel 82.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A cargo management system for use in a vehicle cargo area, the cargo management system comprising:
   a first guide rail and a second guide rail, the first and second guide rails each including an elongate slot at least partially formed therein, wherein the first guide rail and the second guide rail are disposed on a load floor of the vehicle cargo area;
   at least one track incorporating a plurality of locking portions disposed on the load floor proximate the first and second guide rails;
   a support member including a housing and one or more extensions at least partially received within the elongate slot of each of the first and second guide rails and disposed adjacent and movably positioned relative to the load floor; and
   a locking mechanism adjustably connected to the support member housing, the locking mechanism including a locking member having a projection that releasably engages at least one of the plurality of locking portions of the at least one track;
   wherein the support member is movable relative to the load floor through the first and second guide rails and the at least one track between at least an unlocked position and at least one locked position such that the locking member projection engages at least one of the plurality of locking portions of the at least one track to secure the support member adjacent the load floor.

2. The cargo management system of claim 1 wherein the cargo area is defined between a roof, opposing lateral sidewalls and the load floor of the vehicle.

3. The cargo management system of claim 2 wherein the at least one track further comprises a track extending between the first and second guide rails and generally laterally along the load floor between the opposing lateral sidewalls of the cargo area, wherein the track includes a surface receiving the plurality of spaced apart raised plurality of locking portions.

4. The cargo management system of claim 1 wherein the locking member of the locking mechanism includes a first end pivotally connected to the support member housing to position the locking member between the unlocked position and the at least one locked position and a second end supporting the locking member projection for releasably engaging at least one of the plurality of locking portions.

5. The cargo management system of claim 1 wherein the one or more extensions include a first end at least partially received within the slot in the first and second guide rails and a second end pivotally secured to the support member housing.

6. The cargo management system of claim 5 wherein the support member housing may be adjustably positioned about the second end of the one or more extensions between an extended position wherein the support member housing is generally perpendicular to the load floor and a retracted position wherein the support member housing is positioned generally parallel to the load floor.

7. The cargo management system of claim 1 wherein the load floor further comprises an opening extending at least partially through the load floor and a cover panel cooperating with and removably secured adjacent the opening in the load floor to at least partially cover the opening in the load floor.

8. The cargo management system of claim 7 wherein the first and second guide rails and at least one track are disposed on the cover panel to receive and adjustably position the support member.

9. The cargo management system of claim 7 wherein the first and second guide rails disposed on the cover panel extend generally laterally on the cover panel positioned proximate the opposing sides of the at least one track in the cover panel.

10. A vehicle comprising:
a load floor;
opposing sidewalls cooperating with the load floor to at least partially define a cargo area;
a cargo area management system for use in the cargo area, the cargo management system including:
a first guide rail and a second guide rail, the first and second guide rails each including an elongate slot at least partially formed therein, wherein the first guide rail and the second guide rail are disposed on the load floor;
at least one track incorporating a plurality of locking portions disposed on the load floor proximate the first and second guide rails;
a support member including a housing and one or more extensions at least partially received within the elongate slot of each of the first and second guide rails disposed adjacent and movably positioned relative to the load floor; and
a locking mechanism adjustably connected to the support member housing, the locking mechanism including a locking member having a projection that releasably engages at least one of the plurality of locking portions of the at least one track;
wherein the support member is movable relative to the load floor through the first and second guide rails and at least one track between at least an unlocked position and at least one locked position such that the locking member projection engages at least one of the plurality of locking portions of the at least one track to secure the support member adjacent the load floor.

11. The vehicle of claim 10 wherein at least one track further comprises a track having a surface receiving a plurality of spaced apart raised locking portions, the track extending between the first and second guide rails and generally laterally along the load floor between the opposing lateral sidewalls of the cargo area.

12. The vehicle of claim 10 wherein the locking member of the locking mechanism includes a first end pivotally connected to the support member housing to position the locking member between the unlocked position and the at least one locked position and a second end supporting the locking member projection for releasably engaging at least one of the plurality of locking portions.

13. The vehicle of claim 10 wherein the one or more extensions include a first end received within the slot in the first and second guide rails and a second end pivotally secured to the support member housing, wherein the support member housing may be adjustably positioned about the second end of the one or more extensions between an extended position wherein the support member housing is generally perpendicular to the load floor and a retracted position wherein the support member housing is positioned generally parallel to the load floor.

14. The vehicle of claim 10 wherein the load floor further comprises an opening extending at least partially through the load floor and a cover panel cooperating with and removably secured adjacent the opening in the load floor to at least partially cover the opening in the load floor.

15. The vehicle of claim 14 wherein the first and second guide rails and at least one track are disposed on the cover panel to receive and adjustably position the support member.

16. The vehicle of claim 15 wherein the first and second guide rails disposed on the cover panel extend generally laterally on the cover panel positioned proximate the opposing sides of the at least one track in the cover panel.

17. A cargo management system for use in a vehicle cargo area at least partially defined by opposing sidewalls cooperating with a load floor comprising:
a first guide rail and a second guide rail, the first and second guide rails each including an elongate slot at least partially formed therein, wherein the first guide rail and the second guide rail are disposed on and extend generally laterally on the vehicle load floor;
a track disposed on the load floor having a plurality of spaced apart raised locking portions extending from a surface of the track, the track extending generally laterally along the load floor between the opposing lateral sidewalls of the cargo area and proximate the first and second guide rails;
a support member disposed adjacent the load floor including a housing and one or more extensions having a first end adjustably positioned on the housing and a second end at least partially received within the elongate slot of the at least one guide rail; and
a locking mechanism adjustably connected to the support member housing, the locking mechanism including a locking member having a first end pivotally connected to the support member housing to position the locking member between an unlocked position and at least one locked position and a second end supporting a locking member projection for releasably engaging at least one of the plurality of locking portions of the track;
wherein the support member is movable relative to the load floor through the at least one guide rail and at least one track between at least the unlocked position and the at least one locked position such that the locking member projection engages at least one of the plurality of locking portions of the at least one track to secure the support member adjacent the load floor.

18. The cargo management system of claim 17 wherein the one or more extensions include a first end received within the slot in the first and second guide rails and a second end pivotally secured to the support member housing, wherein the support member housing may be adjustably positioned about the second end of the one or more extensions between an extended position wherein the support member housing is generally perpendicular to the load floor and a retracted position wherein the support member housing is positioned generally parallel to the load floor.

* * * * *